United States Patent
Lang

(10) Patent No.: US 11,635,138 B2
(45) Date of Patent: Apr. 25, 2023

(54) FAULT DETECTION FOR A TORQUE CONVERTER

(71) Applicant: ZF Friedrichshafen AG, Friedrichshafen (DE)

(72) Inventor: Ulf Lang, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/549,061

(22) Filed: Dec. 13, 2021

(65) Prior Publication Data

US 2022/0186829 A1    Jun. 16, 2022

(30) Foreign Application Priority Data

Dec. 14, 2020 (DE) .................. 10 2020 215 819.3

(51) Int. Cl.
| | |
|---|---|
| *F16H 61/16* | (2006.01) |
| *F16H 61/14* | (2006.01) |
| *F16H 45/02* | (2006.01) |
| *F16H 45/00* | (2006.01) |

(52) U.S. Cl.
CPC ......... *F16H 61/143* (2013.01); *F16H 45/02* (2013.01); *F16H 61/16* (2013.01); *F16H 2045/002* (2013.01); *F16H 2045/0284* (2013.01); *F16H 2061/163* (2013.01); *F16H 2061/168* (2013.01)

(58) Field of Classification Search
CPC ............... F16H 61/16; F16H 2061/161; F16H 2061/163; F16H 59/141; F16H 2059/141
See application file for complete search history.

(56) References Cited

U.S. PATENT DOCUMENTS

| | | | | |
|---|---|---|---|---|
| 5,599,254 A | * | 2/1997 | Tomisawa | F16H 61/12 192/3.3 |
| 5,609,067 A | * | 3/1997 | Mitchell | F16H 61/12 477/906 |
| 5,609,550 A | * | 3/1997 | Saxena | F16H 61/143 477/166 |
| 8,452,473 B2 | * | 5/2013 | Ganley | B60K 6/485 701/22 |
| 10,352,439 B2 | | 7/2019 | Wohlfahrt | |

FOREIGN PATENT DOCUMENTS

DE    10 2015 215 547 A1    2/2017

\* cited by examiner

*Primary Examiner* — Huan Le
(74) *Attorney, Agent, or Firm* — Finch & Maloney PLLC

(57) ABSTRACT

A monitoring device and a method for operating an idling automatic transmission of a motor vehicle having a torque converter which includes at least one pump wheel and a turbine wheel that are designed to transmit torque hydrodynamically from one to the other. The method includes at least the following steps of: determining a rotational speed of the turbine wheel; determining a load on the motor of the motor vehicle; and recognizing whether there is a blockage in the drive-train of the motor vehicle or whether the torque converter is running dry, as a function of the turbine rotational speed and the motor load detected.

11 Claims, 1 Drawing Sheet

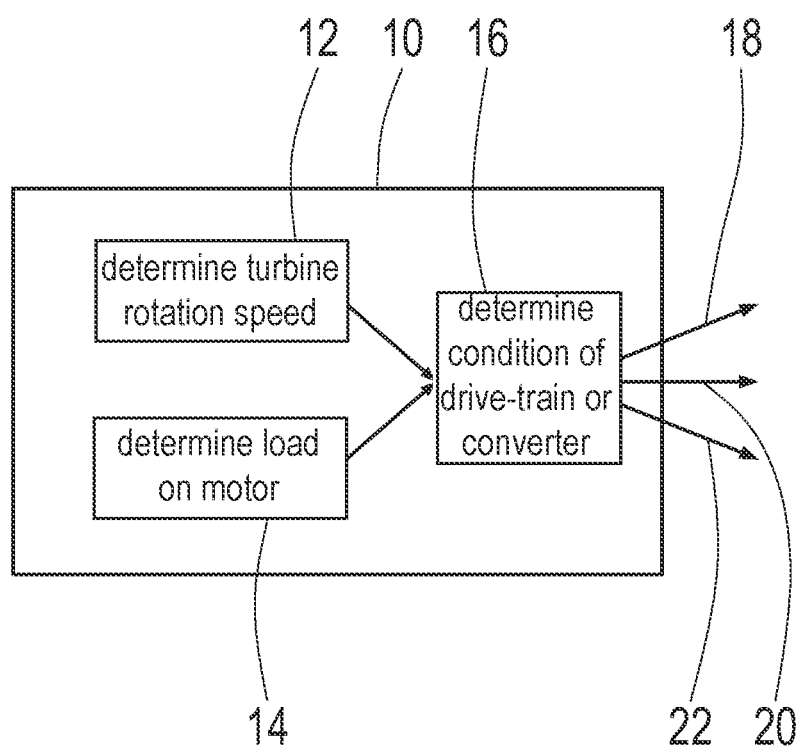

FAULT DETECTION FOR A TORQUE CONVERTER

This application claims priority from German Application Serial No. 10 2020 215 819.3 filed on Dec. 14, 2020.

FIELD OF THE INVENTION

The present invention relates to a method for operating an idling automatic transmission of a motor vehicle with a torque converter. In addition, the invention relates to a monitoring device for an automatic transmission of a motor vehicle with a torque converter.

BACKGROUND OF THE INVENTION

In the prior art, automatic transmissions of motor vehicles can be monitored to see whether any blockage has occurred in the drive-train, even though an automatic transmission connected to the drive output end of a torque converter has been shifted to an idling mode. For that purpose, a rotation speed of a turbine wheel of the torque converter is monitored. If the said rotation speed is zero despite a shift to a neutral gear instead of co-rotating with a pump wheel of the torque converter, a blockage is assumed to be present. Correspondingly, a fault signal is then emitted. This, for example, can prevent damage to the transmission. For example, use of the motor vehicle can be prevented by virtue of the fault signal.

In DE 10 2015 215 547 A1, a method is described for operating an automatic transmission of a motor vehicle with a torque converter. In this case it is provided that during an engaging process of a shifting element of the automatic transmission, a rotation speed of the automatic transmission is monitored fora time, and as a function of this it is determined at which point in time a target pressure level in a hydraulic system is reached.

SUMMARY OF THE INVENTION

A first aspect relates to the operation of an idling automatic transmission of a motor vehicle with a torque converter. The torque converter can comprise at least one pump wheel and a turbine wheel. In addition, the torque converter can comprise a guide wheel. The pump wheel and the turbine wheel can be designed to transmit a torque hydrodynamically from one to the other. For that purpose, the pump wheel and the turbine wheel can each have blades and can be mounted to rotate. A liquid such as oil, for example, can be used as the transfer medium. The transfer medium can be set in motion by the pump wheel, whereby when the torque transmission is functioning, the turbine wheel is moved and so is functionally connected mechanically to the pump wheel. The transfer medium can be held in a housing of the torque converter. The said housing can also accommodate the pump wheel and the turbine wheel. The automatic transmission can be a continuously variable transmission or a transmission in which fixed gear ratios can be mechanically engaged. For example, the automatic transmission can provide various driving ranges, each of which corresponds to a fixed mechanical gear ratio. Idling can be a condition of the automatic transmission in which no torque is transmitted from a drive input of the automatic transmission to its drive output. This is also called the neutral gear. For example, a functional mechanical connection, from the drive input to the drive output, is then mechanically interrupted, for which purpose one or more shifting elements are shifted to their disengaged condition. In the idling condition the turbine wheel can co-rotate freely with the pump wheel. The automatic transmission can be, for example, a mechanical transmission which comprises meshing spur gears and, alternatively or in addition, planetary gearsets. The automatic transmission can comprise one or more shifting elements. The torque converter can simplify or indeed enable the starting of the vehicle with the automatic transmission. The drive-train can comprise a shiftable lock-up clutch of the torque converter.

In the method, a rotation speed of the turbine wheel can be detected. For that purpose, for example, a rotation speed sensor can be provided on the turbine wheel or on an input shaft of the automatic transmission coupled to the turbine wheel. The rotation speed can be, for example, a number of revolutions per minute. In the method a load on the motor can be determined. The load on the motor can be a torque with which a drive-train to be driven by the motor opposes the driving motor. The load can correspond, for example, to an output torque of the motor when the motor is not accelerating any part of the drive-train. The load can then correspond to a motor torque of the motor vehicle. The load on the motor can be, for example, determined by a motor control unit. The load can be, for example, communicated via a CAN bus of the motor vehicle to a monitoring device of the automatic transmission which at least partially implements the method.

The method can have means for recognizing whether a blockage exists in the drive-train of the motor vehicle or whether the torque converter is running dry. The recognition can be done as a function of the rotation speed of the turbine and the motor load detected. This is based on the knowledge that even when the automatic transmission is idling, the turbine wheel can remain almost static without resulting in a blockage in the transmission. For example, such a situation occurs with a dry-running torque converter in which, therefore, the torque transmission between the pump wheel and the turbine wheel is interrupted. A torque converter is running dry, for example, when there is no longer sufficient transfer medium, or none at all, for the hydrodynamic transmission to take place between the pump wheel and the turbine wheel.

This can happen, for example, when an external cooling circuit for the transfer medium is provided, which circuit allows the transfer medium to escape from a housing in which the pump wheel and the turbine wheel are accommodated, even if no defect is present. When the vehicle has been at rest for a long time, the filling level of the housing containing the transfer medium can fall below a minimum value without the torque converter being defective or no longer fit for operation. For example, after the vehicle has been at rest for a long time, the transfer medium can collect in the circuit so that there will then not be enough of it in the torque converter itself or its housing. In such a case, however, the transfer medium does not get lost and is still available for use. For example, by movement of the pump wheel or some other operation of the motor vehicle, already after a short time sufficient transfer medium can again be conveyed into the torque converter from the external cooling circuit to enable torque transmission to resume in the torque converter. Accordingly, the method can be, for example, carried out after starting the vehicle but before it has moved off, in particular, after a predetermined minimum stationary time. The method is only carried out, for example, when the automatic transmission is idling.

When the torque converter is running dry, after a certain operating time the pump wheel can again convey enough transfer medium into the housing to enable torque transmission to take place again. When the dry-running condition is recognized, a 'wait' signal can be emitted for example. This can bring about a pause until the torque converter has filled again before the drive-train begins its regular operation.

The method can also include a further detection of the rotation speed of the turbine wheel following a predetermined interval after the wait signal has been emitted. If the torque converter has still not yet been filled at this point in time, a corresponding fault signal can then be emitted. This can avoid, for example, a failure to emit a fault signal when the torque converter is defective, for example due to an actual loss of transfer medium owing to a leak or some other fault. For example, the rotation speed of the turbine wheel must be above a specified minimum rotation speed after the predetermined interval, for example a rotation speed greater than zero, in order that no corresponding fault signal is emitted.

In contrast, if a blockage has occurred torque transmission in the automatic transmission may be blocked. The reasons for this can be, for example, the erroneous actuation of a clutch, faulty mechanical control, for example due to problems in a hydraulic system, or a mechanical defect such as a tooth fracture. In the case of a blockage, the vehicle should for example no longer be operated, or only so in a restricted mode, in order to avoid damage. In such a case, therefore, a corresponding fault signal can be emitted.

In an embodiment of the method, it can be provided that as a function of the rotation speed of the turbine wheel and the motor load detected, it is recognized whether the drive-train is in a normal condition. In the normal condition, the vehicle can be ready to operate and, for example, immediate starting off can be permitted. In the normal condition, for example the torque converter can be ready to operate so that torque can be transmitted and the automatic transmission can be unblocked. In that case, for example, a ready-to-operate signal can be emitted. This can allow regular use of the motor vehicle.

In an embodiment of the method, it can be provided that the detection of whether there is a blockage in the drive-train or whether the torque converter is running dry only takes place if the rotation speed of the turbine wheel is lower than or equal to a predetermined threshold value. For example, the detection of whether there is a blockage in the drive-train of the motor vehicle or whether the torque converter is running dry can take place if the turbine rotation speed is zero. However, the threshold value can also be higher than zero in order also to detect conditions in which the turbine wheel is co-rotating with the pump wheel but there is a large rotation speed difference between them. For example, this can happen if the torque converter has run dry to a point where just a little torque transmission is possible, which is, however, still insufficient to enable regular vehicle operation. On the other hand, at rotation speeds higher than the threshold value it can be assumed that the torque converter is functioning as it should.

Alternatively or in addition, it can be provided that the detection of whether there is a blockage in the drive-train of the motor vehicle or whether the torque converter is running dry only takes place if a difference between a rotation speed of the pump wheel and a rotation speed of the turbine wheel is larger than a predetermined threshold value. This enables easy recognition of cases in which the torque converter is running only partially dry. This can give rise to conditions in which a torque transmission between the pump wheel and the turbine wheel is possible but so negatively affected by losses that regular operation of the vehicle is not reasonably possible.

In an embodiment of the method, it can be provided that the detection of whether there is a blockage in the drive-train of the motor vehicle or whether the torque converter is running dry only takes place when the motor vehicle is at a standstill. For that purpose a driving speed of the vehicle can be determined. This can be provided, for example, by a rotation speed measuring device on particular axles of the vehicle or by a tachometer. For example, if the vehicle is rolling, then owing to drag effects in the automatic transmission that give rise to rotation of the turbine wheel, this sometimes results in an erroneous recognition. Likewise, the recognition can also take place only after the motor vehicle is switched on, for example after the actuation of a motor starter, in order to avoid erroneous recognition due to inertia effects. For example, even while driving a shift to coasting can be carried out, and the turbine wheel can then continue rotating.

In an embodiment of the method, it can be provided that the recognition that the torque converter has run dry takes place if the load on the motor is lower than a threshold value. In contrast, if the load is greater than or equal to the said threshold value it can be assumed that torque is being transmitted between the turbine wheel and the pump wheel and consequently that the torque converter has not run dry. The threshold can have a fixed, predetermined value, or it can also be calculated as a function of other variables such as a load due to consumers in the motor vehicle such as an air-conditioning unit, on-board electronics and the like. Such parasitic loads can act, for example, upon the motor more on the drive input side than the torque converter and alternatively or in addition the automatic transmission are arranged. An example can also be a power take-off on a power take-off shaft. The recognition that the drive-train is blocked can alternatively or in addition take place if the load on the motor corresponds to or exceeds the threshold value. In that case a torque can be transmitted between the pump wheel and the turbine wheel even though the turbine wheel, for example, is stationary or is moving at a very slow speed. Due to the blockage, the load on the motor can be increased considerably, whereby the blocked condition can be distinguished from the dry-running condition.

In an embodiment of the method, it can be provided that if a dry-running torque converter has been recognized, no fault signal is emitted. In this case regular operation can be possible for a short time, or more. In contrast, the fault signal could produce an error message on an output device for a driver or, undesirably, cause a control unit to prevent regular operation of the vehicle, for example driving the vehicle.

In an embodiment of the method, it can be provided that if a dry-running torque converter has been recognized, a gear engagement in the automatic transmission is prevented until the torque converter has been filled. For this, for example the 'wait' signal can be produced. In that way operation of the torque converter and alternatively or in addition of the automatic transmission and alternatively or in addition of the motor vehicle, for example for driving with the torque converter in an unacceptable condition, can be prevented. The gear engagement can be prevented for a specified time interval. Alternatively or in addition, the gear engagement can be prevented until the rotation speed of the turbine wheel has exceeded a threshold value and, alternatively or in addition, until a rotation speed difference between the pump wheel and the turbine wheel has fallen below a threshold value. Thus, the method can comprise a step in which it is recognized whether the torque converter is now full. It can also be checked that the load on the motor is not unacceptably high.

In an embodiment of the method it can be provided that if a dry-running torque converter is recognized, the gear engagement in the automatic transmission is allowed depending on a subsequently determined rotation speed of the turbine wheel. For this the rotation speed of the turbine wheel can be determined continuously or intermittently in order to be able to recognize the time from when the torque converter has been filled again. For example, the gear engagement is allowed as soon as the rotation speed of the turbine exceeds a threshold value, for example higher than zero. For example, the gear engagement is allowed when the torque converter has been filled again. The engagement of the gear may require the actuation of a shifting element. By virtue of the gear engagement, torque transmission between a drive input and a drive output of the automatic transmission is enabled. When the gear is engaged, the drive input and the drive output of the automatic transmission can be mechanically functionally connected.

In an embodiment of the method, it can be provided that if a blockage has been detected, a fault signal is produced. Appropriate signals can be, for example, electric signals and alternatively or in addition a value in a software application which is processed and, alternatively or in addition, read out by appropriate control units. As a function of the fault signal, for example at least the gear engagement can be blocked by a control unit of the automatic transmission, a gearshift can be permitted, a fault detection program can be started, or driving of the motor vehicle can be prevented.

In an embodiment of the method, it can be provided that the torque converter has an open liquid reservoir. The liquid reservoir can contain the transfer medium of the torque converter. For example, the liquid reservoir can be formed by the housing of the torque converter. 'Open' can mean that the liquid reservoir is fluidically connected with other holding spaces. 'Open' can mean that liquid can come out of the liquid reservoir without any defect, for example in that it flows into lines and containers of a cooling system of the torque converter external to the liquid reservoir. However, in this case 'open' cannot mean that the transfer medium is lost in large amounts in an undesired and uncontrolled manner, and make its way into the surroundings, as could happen if the liquid reservoir, for example, were to fracture. Owing to the open liquid reservoir the filling level in the liquid reservoir can fluctuate, so that despite there being no fault or defect, there is temporarily no longer enough transfer medium for the proper operation of the torque converter.

A second aspect of the invention relates to a monitoring device for an automatic transmission of a motor vehicle with a torque converter. The monitoring device can be designed to carry out the method according to the first aspect. The torque converter can comprise at least one pump wheel and a turbine wheel. The pump wheel and the turbine wheel can be designed to transmit a torque hydrodynamically from one to the other. The monitoring device can be designed such that when the automatic transmission is idling, it detects a rotation speed of the turbine wheel, a load on the motor of the motor vehicle, and as a function of the rotation speed of the turbine and the motor load detected, to recognize whether there is a blockage in the drive-train of the motor vehicle or whether the torque converter is running dry. For this the monitoring device can be designed to emit as a signal the result whether there is a blockage in the drive-train of the motor vehicle or whether the torque converter is running dry. The said signal can be an electric signal and alternatively or in addition a value in a software application which is processed and alternatively or in addition read out by appropriate control units of the motor vehicle. For example the signal can be a fault signal. Furthermore a signal can be emitted only for one of the two conditions and otherwise no signal is emitted. The monitoring device can also be in the form of a control device. Depending on the result whether there is a blockage in the drive-train of the motor vehicle or whether the torque converter is running dry, the said control device can control a function of the vehicle. For example, the control device can prevent or allow a gear engagement, or the use of the motor vehicle for driving can be prevented.

BRIEF DESCRIPTION OF THE DRAWING

FIG. 1 is a schematic view illustrating a method for operating an automatic transmission of a motor vehicle, which method is implemented at least partially by a monitoring device of the transmission.

DETAILED DESCRIPTION OF THE INVENTION

FIG. 1 is a schematic view illustrating a monitoring device 10 for an automatic transmission of a motor vehicle. The automatic transmission comprises a torque converter. The torque converter comprises at least one pump wheel and a turbine wheel. The pump wheel and the turbine wheel are designed to transmit torque hydrodynamically from one to the other. The monitoring device 10 is designed, when the automatic transmission is idling, to determine, as a first step 12 of a method for operating the automatic transmission, the rotation speed of the turbine wheel. In the illustrated example, this determination is carried out by a sensor connected to the monitoring device 10. The monitoring device 10 is designed, when the automatic transmission is idling, to determine, as a step 14 of the said method, a load on the motor of the motor vehicle. For this, in the illustrated example, the value is communicated to the monitoring device 10 by way of a CAN bus of the motor vehicle. In a further step 16 of the method, as a function of the rotation speed of the turbine and the load on the motor detected, the monitoring device 10 recognizes whether there is a blockage in the drive-train of the motor vehicle or whether the torque converter is running dry, or whether the drive-train of the motor vehicle is in a normal condition. The method is carried out when the motor vehicle has first been started up from a standstill but has not yet moved off.

In the illustrated example, a blockage is recognized if the turbine rotation speed detected is zero and the motor load is elevated compared with an expected threshold value which, for example, is stored as a function of other consumers or is a fixed value. In such a case, a fault signal 18 is emitted, which indicates the blocking of other control units. The control units can then control the automatic transmission or the motor vehicle as a function of the said fault signal 18. In the illustrated example, a dry-running torque converter is recognized if the rotation speed of the turbine is zero and the load on the motor is equal to or less than the expected threshold value. In such a case a signal 20 is emitted, which indicates that the torque converter is running dry. In other embodiments, it is also possible for no signal to be emitted or for a signal to be emitted which indicates that the automatic transmission is in the normal condition. In the illustrated example, the normal condition is recognized when the turbine rotation speed is above zero. In such a case, a signal 22 is emitted, which indicates that the automatic transmission is in a normal condition. In other embodiments, it is also possible for no signal to be emitted for the normal condition. The respective signals 18, 20, 22 can be emitted by the monitoring device 10 to the CAN bus.

INDEXES

10 Monitoring device
12 Determination of a rotation speed of the turbine wheel
14 Determination of a load on the motor
16 Recognition whether there is a blockage or whether the torque converter is running dry
18 Fault signal due to a blockage
20 Signal that the torque converter is running dry
22 Signal indicating a normal condition

The invention claimed is:

1. A method of operating an idling automatic transmission of a motor vehicle which has a monitoring device and a torque converter, wherein the torque converter comprises at least one pump wheel and a turbine wheel which are designed to transmit torque hydrodynamically from one to the other, the method comprises at least the following steps:
determining, with the monitoring device, a rotation speed of the turbine wheel;
determining, with the monitoring device, a load on a motor of the motor vehicle; and
recognizing, with the monitoring device, whether there is a blockage in a drive-train of the motor vehicle or whether the torque converter is running dry, as a function of the turbine rotation speed and the motor load determined; and
emitting a signal with the monitoring device to control a transmission of torque via at least one of the torque converter and the automatic transmission based on a recognition of the blockage in the drive-train, a recognition that the torque converter is running dry and a recognition of a normal condition of the drive-train.

2. The method according to claim 1, further comprising recognizing, as the function of the turbine rotation speed and the motor load, whether the drive-train is in the normal condition; and
when the normal condition of the drive-train is recognized by the monitoring device, functionally connecting the pump wheel and the turbine wheel to transmit torque via the torque converter, and actuating a transmission shifting element to engage a gear in the automatic transmission and transmit torque via the automatic transmission to permit starting off of the motor vehicle.

3. The method according to claim 1, further comprising recognizing, with the monitoring device, the blockage in the drive-train of the motor vehicle or the torque converter is running dry only when the rotation speed of the turbine wheel is equal to or lower than a predetermined threshold value.

4. The method according to claim 1, further comprising recognizing, with the monitoring device, the blockage in the drive-train of the motor vehicle or the torque converter is running dry only when the motor vehicle is at rest.

5. The method according to claim 1, further comprising recognizing, with the monitoring device, that the torque converter is running dry when the load on the motor is below a threshold value.

6. The method according to claim 1, further comprising, when it is recognized that the torque converter is running dry, producing a no fault signal with the monitoring device.

7. The method according to claim 1, further comprising, when it is recognized that the torque converter is running dry, producing a wait signal with the monitoring device and preventing a gear engagement in the automatic transmission until the torque converter is filled with a liquid transfer medium.

8. The method according to claim 7, further comprising, when it is recognized that the torque converter is running dry, allowing the gear engagement in the automatic transmission as a function of a subsequently determined rotation speed of the turbine wheel.

9. The method according to claim 1, further comprising, when the blockage in the drive-train is detected by the monitoring device, producing with the monitoring device a fault signal to control transmission of torque via at least one of the torque converter and the automatic transmission.

10. The method according to claim 1, further comprising providing the torque converter with an open liquid reservoir.

11. A monitoring device for an automatic transmission of a motor vehicle having a torque converter, wherein the torque converter comprises at least one pump wheel and a turbine wheel which are designed to transmit torque hydrodynamically from one to the other, and the transmission has a drive input, a drive output and at least one shifting element which is actuatable to engage and disengage the drive input and the drive output, wherein the monitoring device is designed, when the automatic transmission is idling, to:
determine a rotation speed of the turbine wheel;
determine a load on the motor of the motor vehicle; and
as a function of the turbine rotation speed and the motor load determined, to recognize a blockage in a drive-train of the motor vehicle or the torque converter is running dry;
the monitoring device is designed to emit a signal when the blockage in the drive-train is recognized, and emit another signal when the torque converter is running dry is recognized;
the pump wheel and the turbine wheel are functionally connectable and disconnectable to control torque transmission therebetween, and the at least one shifting element is actuatable to engage and disengage the drive input and the drive output of the automatic transmission, based on the signal emitted by the monitoring device.

* * * * *